United States Patent
Vaculin et al.

(10) Patent No.: US 10,896,688 B2
(45) Date of Patent: Jan. 19, 2021

(54) REAL-TIME CONVERSATION ANALYSIS SYSTEM

(71) Applicant: International Business Machines Corporation, Armonk, NY (US)

(72) Inventors: Roman Vaculin, Bronxville, NY (US); Pooja Aggarwall, Bangalore (IN); Seep Goel, Vasant Kunj (IN); Seema Nagar, Bangalore (IN); Kuntal Dey, Vasant Kunj (IN)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 15/976,497

(22) Filed: May 10, 2018

(65) Prior Publication Data
US 2019/0348063 A1 Nov. 14, 2019

(51) Int. Cl.
*G10L 25/00* (2013.01)
*G10L 25/63* (2013.01)
(Continued)

(52) U.S. Cl.
CPC .......... *G10L 25/63* (2013.01); *G06K 9/00288* (2013.01); *G06K 9/6267* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 6,721,704 B1 * | 4/2004 | Strubbe | G10L 25/48 379/88.01 |
| 6,795,808 B1 * | 9/2004 | Strubbe | G10L 15/1822 704/275 |

(Continued)

FOREIGN PATENT DOCUMENTS

| | | |
|---|---|---|
| EP | 002067348 A2 | 6/2009 |
| EP | 2779606 A1 | 9/2014 |
| WO | 0237472 A2 | 5/2002 |

OTHER PUBLICATIONS

D'Arca, Eleonora, Neil M. Robertson, and James Hopgood, "Using the voice spectrum for improved tracking of people in a joint audio-video scheme", Acoustics, Speech and Signal Processing (ICASSP), 2013 IEEE International Conference on. IEEE, 2013.

*Primary Examiner* — Abdelali Serrou
(74) *Attorney, Agent, or Firm* — Troutman Pepper Hamilton Sanders LLP

(57) ABSTRACT

A conversation analysis system has a local system configured to capture conversation data associated with a conversation between an individual and a user and a backend system electronically connected to the local system. The backend system has a suggestion system configured to receive the conversation data from the local system and extract, by an analysis unit, information from the conversation data indicative of a mood of the individual. The suggestion system is further configured to classify, by a classifier unit, the individual based on the extracted information, including determining a current classification and determine, by a suggestion unit, one or more rules based at least on the current classification and stored information in a knowledge base. The suggestion system is further configured to provide, by the suggestion unit, at least one of an alert or suggestion to the user based on the one or more rules.

17 Claims, 6 Drawing Sheets

(51) Int. Cl.
*G06K 9/62* (2006.01)
*G06K 9/00* (2006.01)
*G06N 5/00* (2006.01)
*G10L 17/24* (2013.01)
*G10L 25/57* (2013.01)
*G10L 17/14* (2013.01)

(52) U.S. Cl.
CPC ............... *G06N 5/00* (2013.01); *G10L 17/14* (2013.01); *G10L 17/24* (2013.01); *G10L 25/57* (2013.01)

(56) References Cited

U.S. PATENT DOCUMENTS

| | | | | |
|---|---|---|---|---|
| 8,767,948 | B1* | 7/2014 | Riahi | H04M 3/5235 379/266.08 |
| 9,634,855 | B2* | 4/2017 | Poltorak | G06K 9/00302 |
| 9,788,777 | B1* | 10/2017 | Knight | G10L 25/63 |
| 2010/0185437 | A1* | 7/2010 | Visel | G06F 40/30 704/9 |
| 2011/0178803 | A1* | 7/2011 | Petrushin | G10L 17/26 704/270 |
| 2012/0304206 | A1* | 11/2012 | Roberts | H04H 60/33 725/12 |
| 2012/0324016 | A1 | 12/2012 | Stolorz et al. | |
| 2013/0103624 | A1* | 4/2013 | Thieberger | G06N 5/046 706/12 |
| 2013/0212501 | A1* | 8/2013 | Anderson | G06F 3/011 715/764 |
| 2014/0257820 | A1* | 9/2014 | Laperdon | G10L 25/63 704/270 |
| 2015/0052209 | A1 | 2/2015 | Vorotyntsev | |
| 2015/0178371 | A1* | 6/2015 | Seth | G06F 16/3329 707/748 |
| 2015/0256675 | A1* | 9/2015 | Sri | H04M 3/5183 379/265.09 |
| 2015/0310877 | A1* | 10/2015 | Onishi | G10L 17/00 704/246 |
| 2015/0358416 | A1* | 12/2015 | Gariepy | G06Q 30/02 709/206 |
| 2016/0164813 | A1* | 6/2016 | Anderson | H04L 51/32 709/206 |
| 2016/0171514 | A1 | 6/2016 | Frank | |
| 2016/0210117 | A1* | 7/2016 | Kim | G06F 40/30 |
| 2016/0210962 | A1* | 7/2016 | Kim | G06F 40/274 |
| 2016/0379245 | A1* | 12/2016 | Dey | G06Q 30/0246 705/14.45 |
| 2017/0118515 | A1* | 4/2017 | Dey | H04N 21/4415 |
| 2017/0148073 | A1* | 5/2017 | Nomula | G06F 16/957 |
| 2017/0235361 | A1* | 8/2017 | Rigazio | B60K 35/00 715/710 |
| 2017/0243134 | A1* | 8/2017 | Housman | G06F 16/35 |
| 2018/0032611 | A1* | 2/2018 | Cameron | G06K 9/723 |
| 2018/0136615 | A1* | 5/2018 | Kim | G05B 13/027 |
| 2018/0160055 | A1* | 6/2018 | Taine | H04N 5/272 |
| 2018/0240459 | A1* | 8/2018 | Weng | G06F 3/015 |
| 2019/0033957 | A1* | 1/2019 | Shionozaki | G10L 17/22 |
| 2019/0122661 | A1* | 4/2019 | Hansen | G10L 25/63 |

* cited by examiner

REAL-TIME CONVERSATION ANALYSIS SYSTEM

TECHNICAL FIELD

The present application relates generally to conversation analysis and, more particularly, to a real-time monitoring, suggestion and feedback system for audio-visual data associated with a conversation between individuals.

BACKGROUND

Many systems use technology which permits a conversation to take place between a person and a machine. For instance, many customer service interactions are at least initiated by a person answering prompts from an automated voice system. Many innovations in this space focus on improving the machine's ability to approximate a normal conversation. However, there are many instances in which a conversation between two or more persons could benefit from systematic analysis of the interaction and/or previous similar interactions. For instance, one person in the conversation may benefit by receiving additional information about the other person, such as their current mood and goals for the conversation. If a customer is becoming angry, it would help a customer service representative to know this and to receive suggestions for how to alleviate the situation. Moreover, there may be discoverable patterns across many conversations that can be used to assist individuals in future interactions.

SUMMARY

In one aspect, the present disclosure is directed to a method of providing for real-time analysis of a conversation to an individual in the conversation, including receiving conversation data captured during a conversation between a user and an individual, and extracting information from the conversation data indicative of a mood of the individual. The method further includes classifying the individual based on the extracted information, including determining a current classification, and determining one or more rules based at least on the current classification and stored information in a knowledge base. The method also includes providing at least one of an alert or suggestion to the user based on the one or more rules.

In another aspect, the present disclosure is directed to a conversation analysis system. The conversation analysis system includes a local system configured to capture conversation data associated with a conversation between an individual and a user and a backend system electronically connected to the local system. The backend system includes a suggestion system configured to receive the conversation data from the local system and extract, by an analysis unit, information from the conversation data indicative of a mood of the individual. The suggestion system is further configured to classify, by a classifier unit, the individual based on the extracted information, including determining a current classification and determine, by a suggestion unit, one or more rules based at least on the current classification and stored information in a knowledge base. The suggestion system is further configured to provide, by the suggestion unit, at least one of an alert or suggestion to the user based on the one or more rules.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
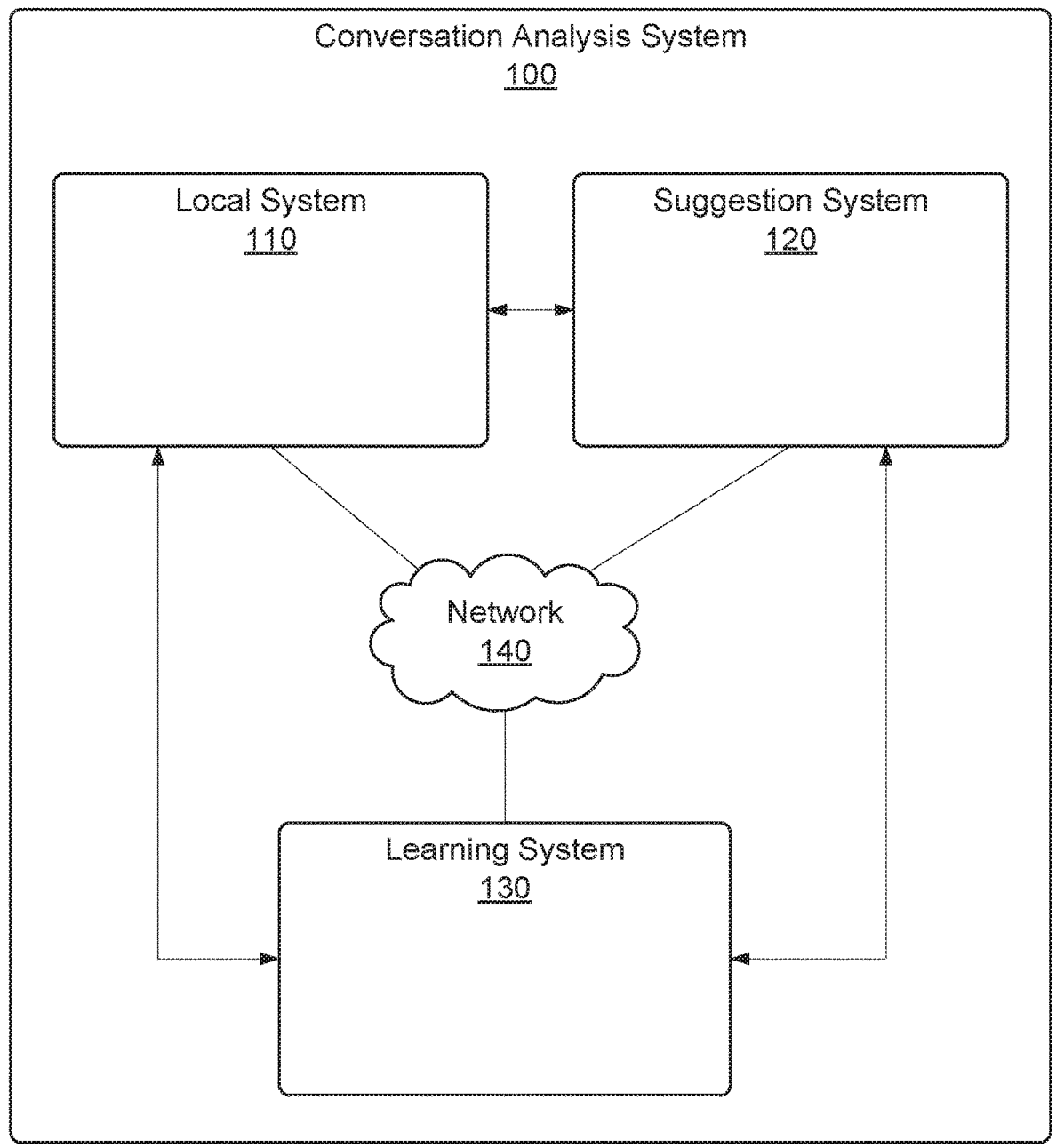
FIG. 1 depicts a schematic diagram of one illustrative embodiment of a conversation analysis system, consistent with disclosed embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/ processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

As an overview, a conversation analysis system includes a local system which interfaces with one or more users during a conversation with another person and a backend system which receives information from and provides feedback to the local system. The backend system includes various modules or units which take information about the conversation and produce a suggestion which may be provided to the user for real-time use during the conversation.

The local system may include various interfacing devices, including audio and/or visual capture devices which collect data associated with a person in the conversation, such as the person's speech, facial expressions, gestures, etc. The data is fed to the backend system for analysis. A suggestion system may analyze the data to identify characteristics of the conversation, such as the person's mood, tone, expectations, and goals. For example, the suggestion system may compare the data to previous data about the same individual or individuals in a similar situation. The suggestion system may identify a suggestion for the conversation that may be used by the user who is speaking with the person. For example, the backend system may provide the suggestion to the user through an output device on the local system. The suggestion may be an answer to a question or a statement which fulfills a goal of the person in the conversation, for example. The local system and/or suggestion system may also provide data to a learning system for use in machine learning, retention, and use during future conversation analyses.

The backend system is preferably configured with an analysis unit which extracts useful information from the conversation data, such as facial expressions, choice of words, hand gestures, tone, etc. The backend system also preferably includes a recognition system which may use conversation data to try to find a match to a previous conversation with the same individual or an individual in a similar circumstance such that the knowledge of the course and outcome of the previous conversation may be used to guide a current conversation with a same or similar individual. In addition, a classification system may be provided in order to analyze the useful information extracted from the conversation data and classify the individual in real-time, such as to classify the mood of the individual as happy, angry, bored, disappointed, sad, etc.

FIG. 1 depicts a schematic diagram of one illustrative embodiment of a conversation analysis system 100. The conversation analysis system 100 includes a local system 110, a suggestion system 120, and a learning system 130 which are connected through a network 140. The local system 110, suggestion system 120, and learning system 130 are functionally represented as singular separate components but it should be understood that the disclosed embodiments are not so limited. Moreover, the systems may be combined in some embodiments.

The local system 110 may be implemented in hardware and/or software and may include various constituent components which form the local system 110. These components may include, for example, audio visual capture devices which are configured to collect data associated with a conversation, communication hardware for sending and receiving data from other parts of the conversation analysis system, and an output device for providing information to a user, such as a real-time suggestion for the ongoing conversation.

The suggestion system 120 may be implemented in hardware and/or software and may include various constituent components which form the suggestion system 120. These components may include various modules and/or units which, for example, analyze conversation data received from the local system 110, identify characteristics of the conversation, identify one or more suggestions for driving the conversation in an effective manner, and communicate with the learning system 130 to update and improve analysis processes.

The learning system 130 may be implemented in hardware and/or software and may include various constituent components which form the learning system 130. These components may include various modules and/or units which, for example, accumulate and store information from past conversations, identify patterns in the data, determine rules for guiding the analysis of a conversation, and receive and store feedback from a user based on a suggestion.

The network 140 may be a local or global network and may include wired and/or wireless components and functionality which enable communication between the local system 110, suggestion system 120, and the learning system 130. The network may be embodied by the Internet, provided at least in part via cloud services, and/or may include one or more communication devices or systems which enable data transfer to and from the systems and components of the local system 110, suggestion system 120, and/or learning system 130.

In accordance with some exemplary embodiments, the elements of conversation analysis system 100 include logic implemented in specialized hardware, software executed on hardware, or any combination of specialized hardware and software executed on hardware, for implementing an the conversation analysis system 100. In some exemplary embodiments, the conversation analysis system 100 may be or include the IBM Watson system available from International Business Machines Corporation of Armonk, N.Y., which is augmented with the mechanisms of the illustrative embodiments described hereafter.

Figure 2:
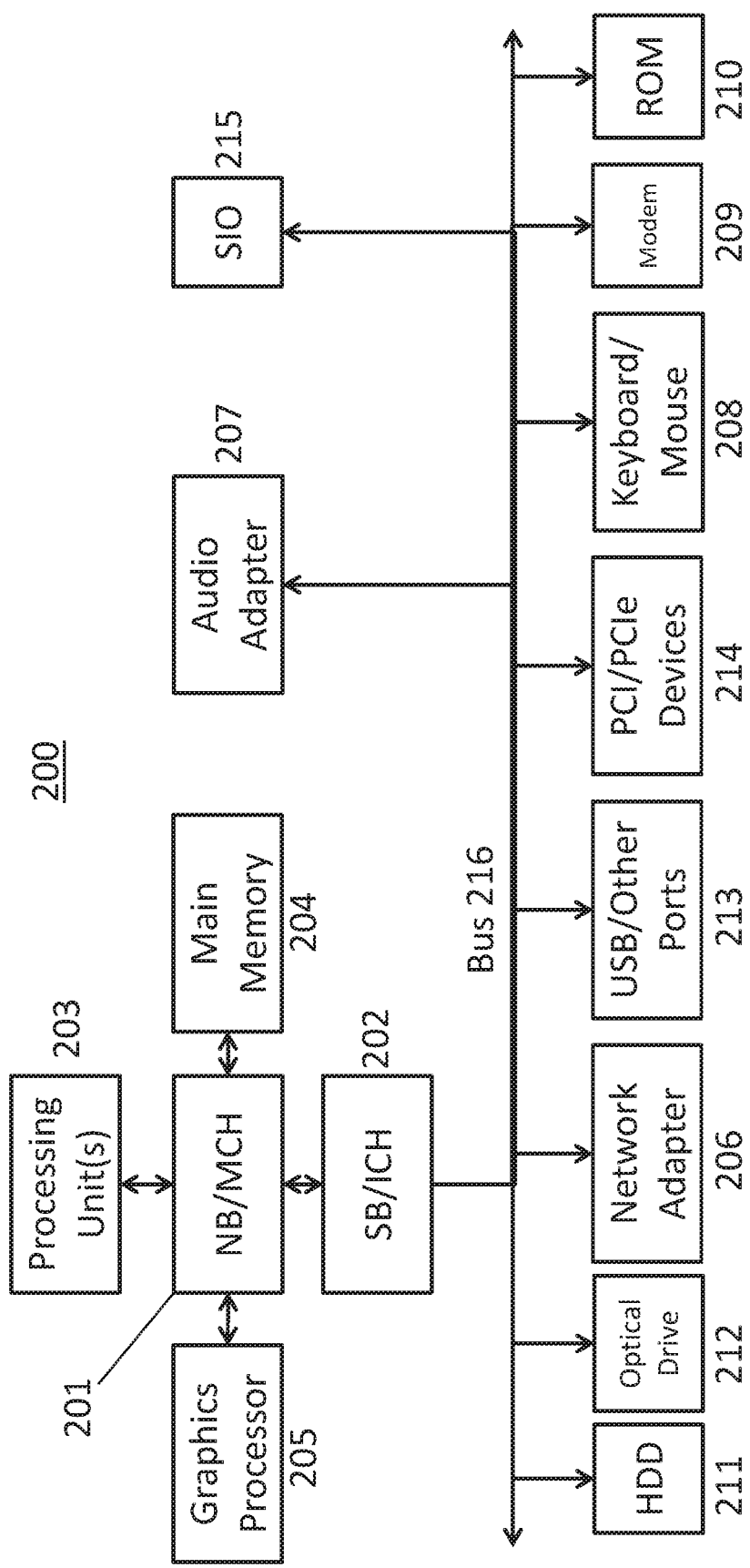
FIG. 2 depicts a block diagram of an example data processing system in which aspects of the illustrative embodiments may be implemented, consistent with disclosed embodiments.

FIG. 2 is a block diagram of an example data processing system 200 in which aspects of the illustrative embodiments are implemented. Data processing system 200 is an example of a computer, such as a server or client, in which computer usable code or instructions implementing the process for illustrative embodiments of the present invention are located. In one embodiment, FIG. 2 represents a server computing device, such as a server, which implements the conversation analysis system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System P® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the conversation analysis system 100 can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
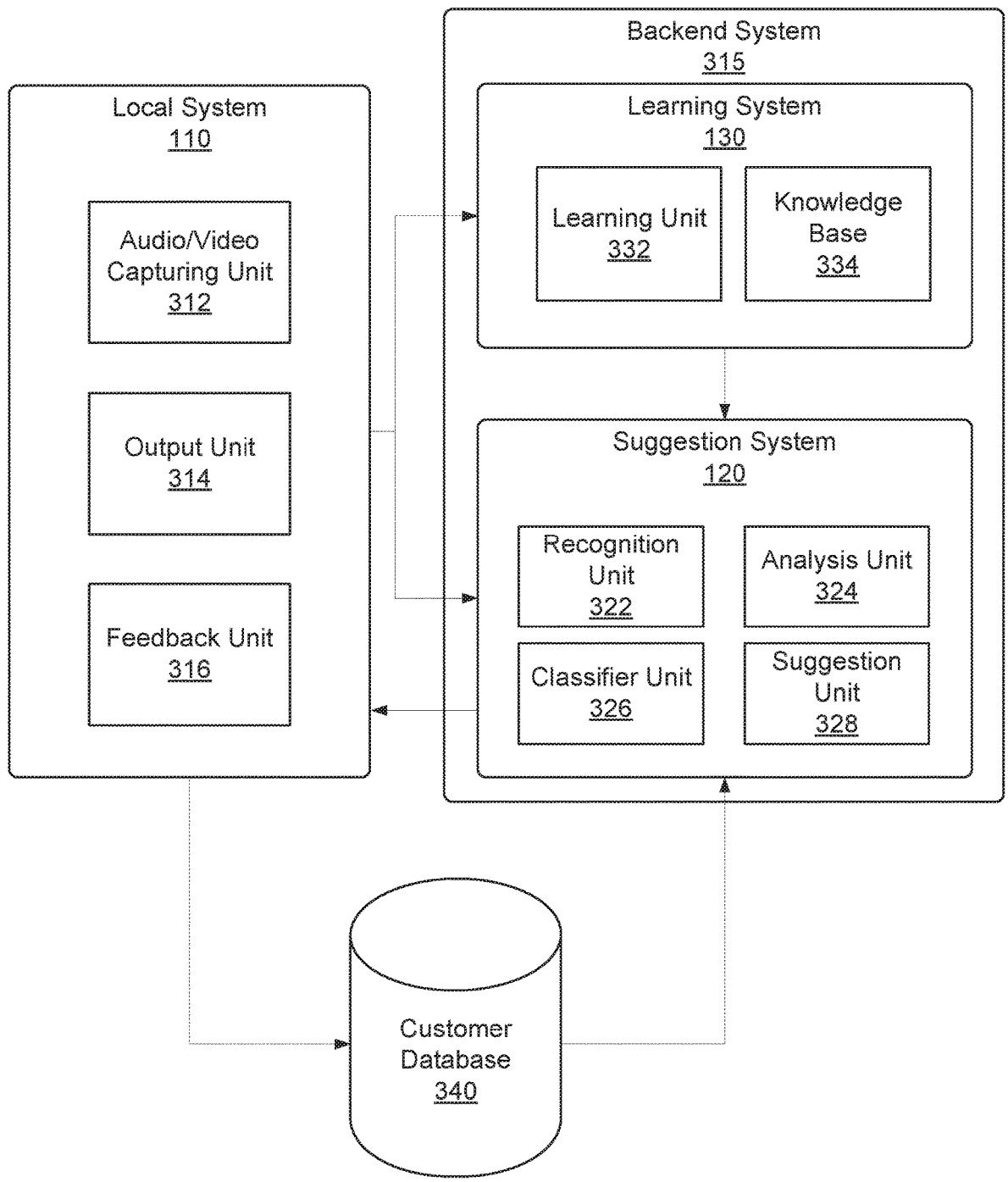
FIG. 3 further depicts an exemplary system architecture of the conversation analysis system, consistent with disclosed embodiments.

FIG. 3 further illustrates an exemplary system architecture of the conversation analysis system 100, including the local system 110, the suggestion system 120, and the learning system 130. In one embodiment, the suggestion system 120 and the learning system 130 are components of a backend system 315. It should be understood that the backend system 315 may include only some of the underlying components of these systems and/or may include one or more components of the local system 110. The backend system 315 may be a server or other computing device remotely located from the conversation or may be present with the local system 110 with at least one person in the conversation.

Each of the depicted components are exemplary and may be implemented as units, modules, databases, or other computing components in hardware or software or in a combination thereof. The exemplary components are configured to efficiently analyze conversation data, provide a suggestion, receive feedback, and improve analysis processes through learning by implementing the hardware components in streamlined configuration, such as the exemplary embodiment depicted and described. The components, in at least some embodiments, are implemented as a specialized system for providing conversation analysis in real-time, including intake of conversation data, output of suggestions, and focused feedback throughout the conversation.

In a preferred embodiment, the conversation analysis system 100 may be implemented and used in a situation in which a first person ("user") is in a conversation with a second person ("individual"). In some embodiments, this conversation takes place face-to-face. In other embodiments, the conversation is remotely executed, such as through a video call or audio call. In one embodiment, the individual is unaware that the conversation analysis system 100 is in use. In other embodiments, the individual may be aware of the conversation analysis system. Further, embodiments are not limited to conversations between only two people. There may be multiple users and/or multiple individuals in the conversation.

Example scenarios in which the conversation analysis system may be employed include customer service interactions, sales interactions, pitch meetings, interview environments, speakers and presentations, and the like. For example, a customer may return an item or bring a grievance to a customer service representative. The customer service representative may be the user of the conversation analysis system 100 in order to help optimally guide the interaction with the customer. In another example, a salesperson may use the conversation analysis system to guide and assist a potential sale with a customer.

The exemplary components illustrated in FIG. 3 are configured to help provide the services that assist in the exemplary conversations described above. In one embodiment, the local system 110 includes at least an audio/video capturing unit 312, a feedback unit 316, and an output unit 314. The suggestion system 120 may include a recognition unit 322, an analysis unit 324, a classifier unit 326, and a suggestion unit 328. The learning system 130 may include a learning unit 332 and a knowledge base 334. A customer database 340 may be connected to one or more of the local system 110, suggestion system 120, and learning system 130.

The audio/video capturing unit 312 of the local system 110 may include hardware components configured to capture conversation data associated with a real-time conversation. For example, the audio/video capturing unit 312 may include a camera and microphone sufficient to capture conversation data with reasonable clarity. In some embodiments, the camera and microphone of many modern smart phones are sufficient. The camera may be positioned to capture images at least one individual in the conversation with the user. The microphone may be likewise positioned to capture audio data from the individual. In some embodiments, the individual is not aware of the audio/video capturing unit. The conversation analysis system 100 may also be used in situations in which all parties are aware of the system, but it may affect the conversation, such as by altering the reactions of the individual who is aware they are being monitored. The audio/video unit 312 is preferably implemented in hardware (e.g., camera, smartphone, tablet, computer) and includes software configured to perform process steps, such as transmitting conversation data via the network 140.

The output unit 314 of the local system 110 is another hardware component which is configured to provide information to the user in the conversation, such as a suggestion from the suggestion system 120. For example, the output unit 314 may be a visual output device such as a screen and/or an audio output device such as a speaker. The screen may be the screen of a user's computer, tablet, or smartphone, for example. The speaker may be a small in-ear device which outputs at a low volume so that the individual in the conversation is not aware of the output unit 314. The output unit 314 may include software components which receive data via the network 140, such as suggestions from the suggestion system 120. In some embodiments, the audio/video unit 312 and the output unit 314 are integrated into one hardware I/O device, such as a laptop computer.

The feedback unit 316 is another component of the local system 110 and may be implemented in hardware or software in order to provide feedback to other components of the conversation analysis system 100. For example, the feedback unit 316 may include hardware such as an audio capturing device which is configured to capture audio data from the conversation, preferably including the user. In this way, the feedback unit 316 is configured to capture conversation data which identifies whether the user accepted or rejected a suggestion provided by the output unit 314. The feedback unit 316 may be implemented in other manners. For example, the feedback unit 316 may be combined with the audio/video capture unit 312 which captures conversation data. A software portion of the feedback unit 316 may transmit the conversation data via the network 140 and/or may include local tools to determine whether the user accepted or rejected the suggestion. For example, the feedback unit 316 may include speech recognition software. In another example, the feedback unit 316 may be another I/O device, such as an input system which allows the user to select whether the suggestion was or will be used or rejected (e.g., a computer screen in front of the user during the conversation).

The audio/video capturing unit 312, output unit 314, and feedback unit 316 are part of the local system 110 and are in place to facilitate the interfacing of the conversation analysis system 100 with the user and individual(s) in the conversation. These components allow conversation data to be collected and transmitted to the backend system 315 (i.e., the suggestion system 120 and learning system 130) for real-time analysis. These local components also allow a suggestion to be received from the backend system 315, the suggestion being identified as potentially improving the conversation in some way. The user may accept the suggestion and integrate it into the conversation in real-time or may skip or reject the suggestion. The knowledge of whether the suggestion was used or rejected is useful for future interactions and analysis, so the local system, via the feedback unit 316, is also configured to inform the backend system 315 of this information.

The backend system 315 of the conversation analysis system 100 may include the suggestion system 120 and the learning system 130. While these components are described as a backend system 315, it should be understood that any or all of them may be "local" to the conversation and the local system 110. For example, any or all of the components of the backend system 315 may be integrated into one or more components of the local system 110. The backend system 315 is configured to perform data analysis of the conversation data gathered by the local system and provide suggestions or other information to the user for use during the conversation. In addition, the backend system 315 may be configured to compile information across many conversations and other sources of data in order to learn and improve the associated processes of providing a suggestion to a user.

The suggestion system 120 is implemented in hardware and/or software and includes one or more processing units configured to identify a suggestion for the user to use in a real-time conversation which is being monitored by the local system 110. The suggestion system 120 includes components which receive the conversation data collected by the local system 110, analyze the conversation data, and determine a suggestion which may assist or improve the conversation between the user and the individual. In analyzing the conversation data, the suggestion system 120 may communicate with the learning system 130 and/or the customer database 340 in order to compare the current conversation data to previous data in order to extract information about the current conversation as well as comply with any rules which have been set to govern the determination of a suggestion.

The recognition unit 322 is a component configured to receive conversation data, which may include audio conversation data and/or video conversation data. The recognition unit 322 is preferably configured to compare the conversation data to previously-stored data in order to recognize a characteristic of the conversation. The characteristic of the conversation may be, for example, the individual or user speaking or present in the conversation. The recognition unit 322 may include image and/or voice or speech recognition software and components which allow the recognition unit 322 to recognize the characteristic of the conversation. For example, the recognition unit 322 may compare the current audio and/or image data to stored data in order to identify previous conversations with the same individual. The recognition unit 322 may include a database and/or working memory to store the current conversation data in order to facilitate the operation. The recognition unit 322 may call from the customer database 340 all previous conversations with the same individual and any associated data (e.g., outcome of the previous conversation, identity of the user, etc.).

The analysis unit 324 is another component which is configured to receive conversation data, including audio and/or image data. The analysis unit 324 is configured to extract essential information from the conversation data. For example, the analysis unit 324 may identify facial expressions and hand gestures from the image data and/or choice of words and tone of voice from the audio data. This essential information characterizes the individual by identifying what they are saying, how they are saying it, and possibly even why they are saying it. For example, the analysis unit 324 may identify movement of eyebrows and/or lips in image data to characterize a facial expression. In another example, the analysis unit 324 may identify the words being spoken and look for speech patterns to further characterize what the individual is saying. The analysis unit 324 may include motion-capture technology, facial expression capture technology, speech analysis technology, and the like, in order to identify the content of the conversation and/or extract essential elements therein.

The analysis unit 324 may also communicate with the learning system 130 and/or customer database 340 in order to identify previous conversations, between the same or different people, which are relevant to the conversation. For example, the analysis unit 324 may compare the extracted essential information to information associated with stored conversations to identify conversations on a similar topic, involving similarly-situated individuals, similar facial expressions or tones, and the like. The analysis unit 324 performs a similar task to the recognition unit 322 but can be characterized as reviewing the content of the conversation data as opposed to the context of the conversation data. It should be understood, however, that these components may perform related or overlapping tasks, and may be a single component or module in some embodiments.

The suggestion system 120 further includes the classifier unit 326, which is a module or component implemented to review conversation data and/or information output by the recognition unit 322 and/or analysis unit 324 in order to identify a classification associated with the conversation. For example, the classifier unit 326 may use information from the recognition unit 322, analysis unit 324, learning system 130, and/or customer database 340 in order to classify the reaction or current state of the individual in the conversation. The classification may be customized depending on the context of the conversation, but may generally translate to a mood classification, for example, happy, angry, sad, bored, disappointed, etc. Other classifications, such as goals, topic, etc., may be used as classifications. The classification may be used in determining a suggestion for the user, but may also be discretely useful information which may be provided to the user through the local system 110. For example, the classifier unit 326 may provide periodic updates on the current classification of the individual, including updates when the classification changes and/or when an amount of time has elapsed with no change in classification. In this way, the user is kept up-to-date on the current mood of the individual and can use this information to drive the conversation and make speech choices.

The suggestion unit 328 is connected to the recognition unit 322, analysis unit 324, and the classifier unit 326. The suggestion unit 328 is configured to analyze the conversation data and/or the output of the connected units in order to identify one or more suggestions for the user to use in the conversation. The suggestion could include talking points, offers, topics, cues, statements, etc., which may help to improve or drive the conversation with the individual. For example, the suggestion unit 328 may communicate with the classifier unit 326 to identify a current state of the individual in the conversation, the recognition unit 322 and/or analysis unit 324 to receive characteristics of the conversation and compare this information to a stored rule to determine a suggestion for improving or driving the conversation with the individual. The user may receive the suggestion through the output unit 314. The user may accept or reject the suggestion, with this information being captured by the local system 110 and being sent to the learning system 130 and/or customer database 340 by the feedback unit 316. In this way, a feedback loop for the suggestions is provided. This feedback loop may enhance the learning system 130 by allowing the learning system 130 to store outcomes associated with suggestions.

It should be understood that the units described in relation to the suggestion system 120 are exemplary and that one or more of these units may be combined or omitted and one or more additional or alternative units may be included. For example, in some embodiments, the suggestion system 120 further includes an alerting unit. The alerting unit may be configured to determine when the user should be provided with a communication, such as a classification of the individual and/or a suggestion.

The suggestion system 120 provides, in at least some embodiments, a specialized system which is particularly configured to analyze the aspects of a conversation between at least two people and to provide information about the conversation in real-time to at least one of the people in the conversation. This provides the user with additional information that may not be easily recognizable or perceptible and can help to improve or drive the conversation in a particular direction.

The suggestion system 120 may rely at least partially on governing information which allows the system to characterize conversation data and which may target the aspects of conversations which may not be easily perceptible or trackable. For example, the suggestion system 120 may include rules and components dedicated or related to analyzing tone of voice of the individual. Tone involves the volume of speaking, word emphasis, and emotional cues in the speech. The tone of voice used in speech relays a message that may not match the content of the words being spoken but nonetheless communicates information. Similarly, facial expressions are non-verbal cues which communicate information about the speaker. Positioning and presence of various facial features may be used to identify a particular feeling of the individual. Facial expressions may identify when the user is sad, angry, disgusted, surprised, etc. Another example of non-verbal communication is hand gestures. The hand gestures that a person uses while speaking may provide clues to how that person feels, what they are seeking, provide context for their words, etc. For example, a person that is not using their hands while speaking may be perceived as indifferent. Hidden hands may indicate untrustworthy statements. Open palms may signal honesty while palms being angled downward may indicate confidence. These correlations may be different for different individuals but may be generally used as base information for providing information for classifying a speaker and/or providing a suggestion for responding to the speaker.

The suggestion system 120 may use the baseline information about speech and non-verbal clues to classify captured conversation data and identify suggestions for the user. The user is alerted to the individuals classification (e.g., mood) and/or provided a suggestion for driving the conversation in an efficient or useful direction. As the conversation progresses, feedback will begin to accumulate. For example, as the user provides responses to the individual, the individual may change their mood. This may be recognized in their speech and/or non-verbal reactions. Moreover, the user may use a suggestion which may produce a reaction from the individual or the user may choose to ignore the suggestion. All of these scenarios can be collected as real-time conversation data and provided back to the suggestion system 120 for continued monitoring and updating of the tracked conversation. In addition, this information is preferably provided to the learning system 130 and/or the customer database 340. For example, conversation data and feedback data may be provided to the learning system 130 to identify and construct rules around the conversations so that working suggestions can be prioritized and applied to future conversations and the overall analysis system is improved to account for past events.

In an exemplary embodiment, the learning system 130 includes the learning unit 332 and the knowledge base 334. The learning unit 332 may be a hardware and/or software component which is configured to find patterns in stored data and identify rules based on the outcomes of suggestions provided to the user. The knowledge base 334 may initially include rules based on what is known about human behavior such as the intent and emotions associated with speech and non-verbal analysis. The learning unit 332 may add rules into the knowledge base 334 such that the knowledge base 334 becomes richer as more conversations are analyzed and rules are identified by the learning unit 332.

The customer database 340 is a storage device for maintaining data related to conversation analysis for use by the components of the conversation analysis system 100. For example, the customer database 340 may store captured conversation data before and/or after it is provided to the suggestion system 120 and learning system 130.

Figure 4:
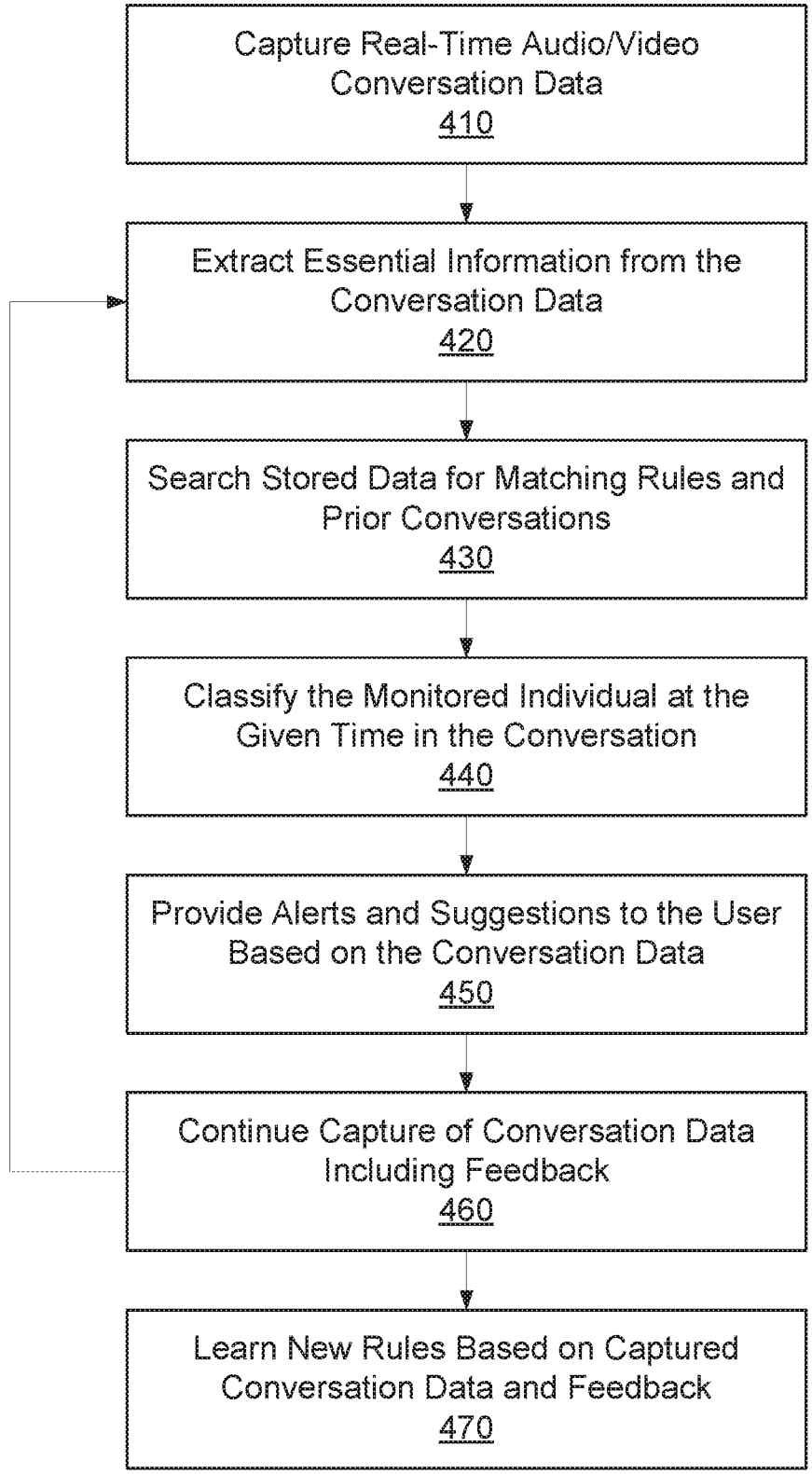
FIG. 4 depicts a flowchart of an exemplary conversation analysis process, consistent with disclosed embodiments.

FIG. 4 includes a flowchart of a conversation analysis process 400, consistent with disclosed embodiments. The process 400 may be executed by one or more components of the conversation analysis system 100, including one or more of local system 110, suggestion system 120, and learning system 130. The process may be used in real-time during a conversation between a user and an individual. However, it should be understood that some or all of the process may be performed before or after the conversation, such as to prepare the user for the conversation or to update the learning system 130 after the conversation is over.

In step 410, the conversation analysis system 100 captures real-time audio/video conversation data. For example, the local system 110, through audio/video capturing unit 312, receives data from capturing devices such as cameras and microphones that capture information from the conversation. This conversation data may include audio and video data, but could include only one of these in some situations (e.g., when the conversation is a phone call). The captured data preferably includes audio of the conversation (both the individual and the user, but audio of the individual may suffice) as well as video of the individual as they are speaking and listening to the user.

In one example, a customer service representative of a retail store may be the user and a customer of the store the individual. One or more cameras and one or more microphones may be positioned in the retail store to capture the individual's speech and actions. In another example, a person giving a pitch may be the user and a potential customer or client the individual. The user may carry a computer, tablet, or smartphone which includes the audio/video capturing unit 312 for capturing the potential customer during the pitch meeting.

The captured conversation data is transmitted by the local system 110 and received by the backend system 315. In steps 420 and 430, the backend system 315 then analyzes the conversation data. In step 420, the backend system 315 extracts essential information from the conversation data. For example, the analysis unit 324 may analyze video data to search for non-verbal clues such as facial expressions and hand gestures and/or analyze the audio data to evaluate the content of the words being spoken as well as the tone and any other audible indicators which may help to understand the state, intent, and goals or the individual.

In step 430, the backend system 315 searches stored data for matching rules and prior conversations. For example, the recognition unit 322 may use voice or face recognition to try to find previous conversations with the same individual. The recognition unit 322 (or analysis unit 324) may search for stored conversations which were on a similar topic or included similar characteristics. The analysis unit 324 may also communicate with the learning system 130 and/or the customer database 340 to identify rules for analyzing the conversation.

In step 440, the backend system 315 classifies the monitored individual at that particular time. For example, the classifier system 326 may receive the extracted essential information from the current conversation data, matching conversation information, and/or relevant rules to classify the individual at that time in the conversation. The classification may include mood, such as happy, angry, sad, disappointed, bored, etc.

In the above-described examples, the classifier unit 326 may receive input that classify the customer in the retail store as angry or sad or the potential customer in the pitch meeting as bored, which are likely undesirable scenarios which the user wants to change to achieve a better interaction (e.g., satisfy the customer or convince the potential customer).

In step 450, the backend system 315 provides alerts and suggestions to the user through the local system 110. For example the backend system 315 may provide a classification to the output unit 314 to inform the user of the current mood of the individual in the conversation. The backend system 315 may also identify and provide suggestions to the output unit 314. The suggestions may be based on rules in the knowledge base 334. For example, the backend system 315 may suggest to the user to change the topic of conversation to discuss an offer or deal when the customer becomes angry or frustrated or to move on to a different topic when a potential customer is bored.

In step 460, conversation data is continuously captured even after an alert or suggestion is provided to the user. In this way, the backend system 315 may receive conversation data which reflects a reaction to an alert or suggest or a changing attitude of the individual. For example, if user is suggested to change the topic and the individual changes from angry to happy, this information will be captured in the conversation data. The process repeats at step 420 with the newly-acquired conversation data in order to provide a continuous monitoring, alerting, and suggestion scheme for the user which reflects the changing dynamics of the conversation as well as the result of providing suggestions to the user to drive the conversation (i.e., providing instant feedback).

In step 470, the conversation data is also used by the learning system 130 to learn new rules. For example, the learning unit 332 may receive feedback from the local system 110 and compare the outcome and results to suggestions and alerts to previous outcomes to continuously improve the baseline rules in the knowledge base 334. For example, positive reactions and changes in classification may be tracked in order to identify suggestions, statements, topics, etc., which produce those changes. These effects may be stored in the knowledge base 334 as rules which are used by, for example, the classifier unit 326 and suggestion unit 328 in future conversations.

Figure 5:
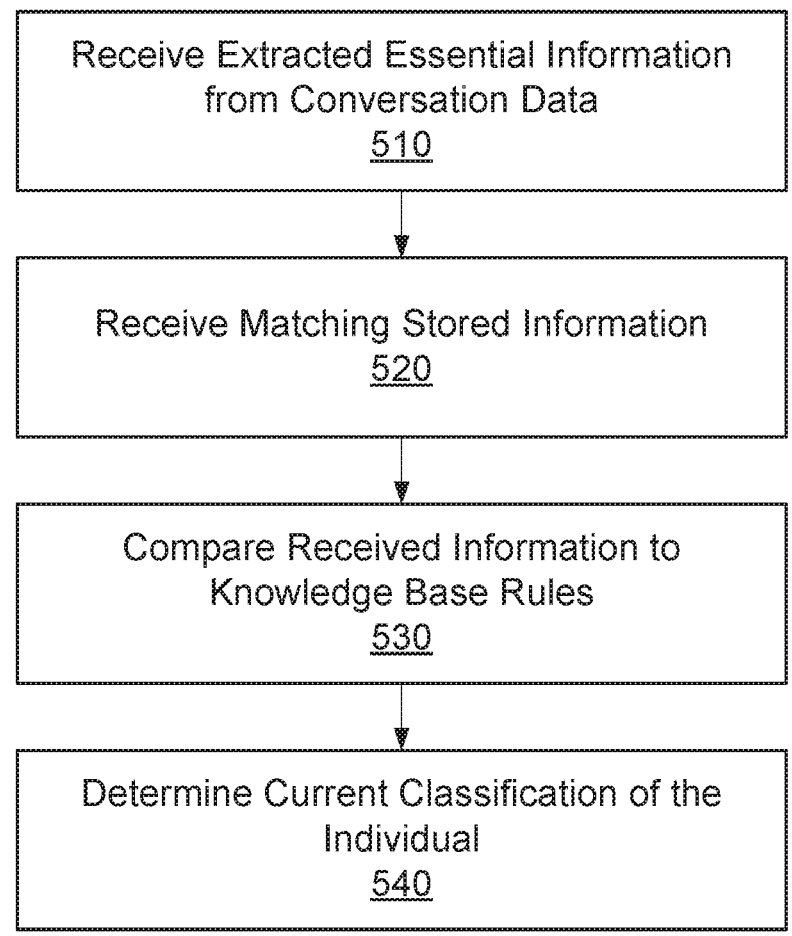
FIG. 5 depicts a flowchart of an exemplary classification process, consistent with disclosed embodiments.

FIG. 5 is a flowchart of an exemplary classification process 500. In one embodiment, the backend system 315 may execute the classification process 500 in order to identify a current state associated with the conversation between the user and the individual. The process 500 may correspond to step 440 of process 400 in that the conversation analysis system 100 may use classification in order to identify a real-time state of the conversation and, as described herein, provide that classification to the user, monitor the conversation for changes to the classification, and provide suggestions depending on the classification and/or change in classification. As described herein, the backend system 315 may determine a classification based on the conversation data analyzed by the suggestion system 120 and information in the knowledge base 334 and/or customer database 340.

In step 510, the classifier unit 326 may receive extracted essential information from the conversation data. The essential information corresponds to the details identified by the analysis unit in the analysis of the captured audio and video data. As described herein, this information may include characteristics such as tone of voice, a particular hand gesture, a facial expression, and the meaning of the words being used.

In step 520, the classifier unit 326 may receive stored information. For example, the classifier unit 326 may receive rules from the knowledge base 334 which match essential information with classifications. In step 530, the classifier unit 326 may compare the received information to the stored information. The knowledge base 334 may store a rule-based or score-based system which the classifier unit 326 may utilize when comparing the received information (i.e., the filtered and analyzed conversation data) to the stored information (the rules in the knowledge base 334). For example, facial expressions, tone, words, hand gestures, etc. may be weighted and scored according to stored rules in order to provide context to the extracted information.

In step 540, the classifier unit 326 determines the current classification of the individual. The classification may correspond to one of several options in a particular classification scheme for the conversation. For example, as described herein, the classification may correspond to a mood of the individual. In another example, the classification may correspond to a numerical value, such as a value between 1-10 which characterizes the degree to which a particular mood or emotion is presented by the individual. In some embodiments, the classification may include a characterization (e.g., mood) and a numerical value, which may be a degree of the characterization and/or a confidence score in the characterization.

After comparing the received information to the stored information, the classifier unit may determine an overall classification of the individual at the given time. For example, give certain identified characteristics, such as stern facial expression, use of strong words, and aggressive hand gestures, the classifier unit 326 may determine that the user has a classification of angry. The classifier unit 326 may provide the classification to an alerting unit (e.g., the suggestion unit 328 or another unit) so that the classification is transmitted to the local system 110.

Initially, the classifier unit 326 may rely on prior knowledge of human interactions in order to provide classifications. For example, the knowledge base 334 may be populated with rules which reflect our understanding of human interaction, emotion, and conditions. As more conversations are characterized and individuals are classified, the built in feedback system will allow the classifier unit 326 to use learned knowledge of human reactions, which may differ from a common understanding in certain situations and which may be learned by analyzing recurring similar situations between users of the system and various or repeated individuals.

The classification identified by the classifier unit 326 and which may be provided to the user may have some value to the user in that it identifies something about the conversation that may not be easily perceptible. For example, a person may be angry or sad even though the words that they are saying do not indicate it. In this way, the conversation analysis system 100 may provide additional information which is useful to a user. However, in many cases, the mood of the individual may be easily identifiable to the user. In both situations, it would be helpful for the user to receive knowledge-based suggestions on how to drive the conversation in a positive and useful direction.

Figure 6:
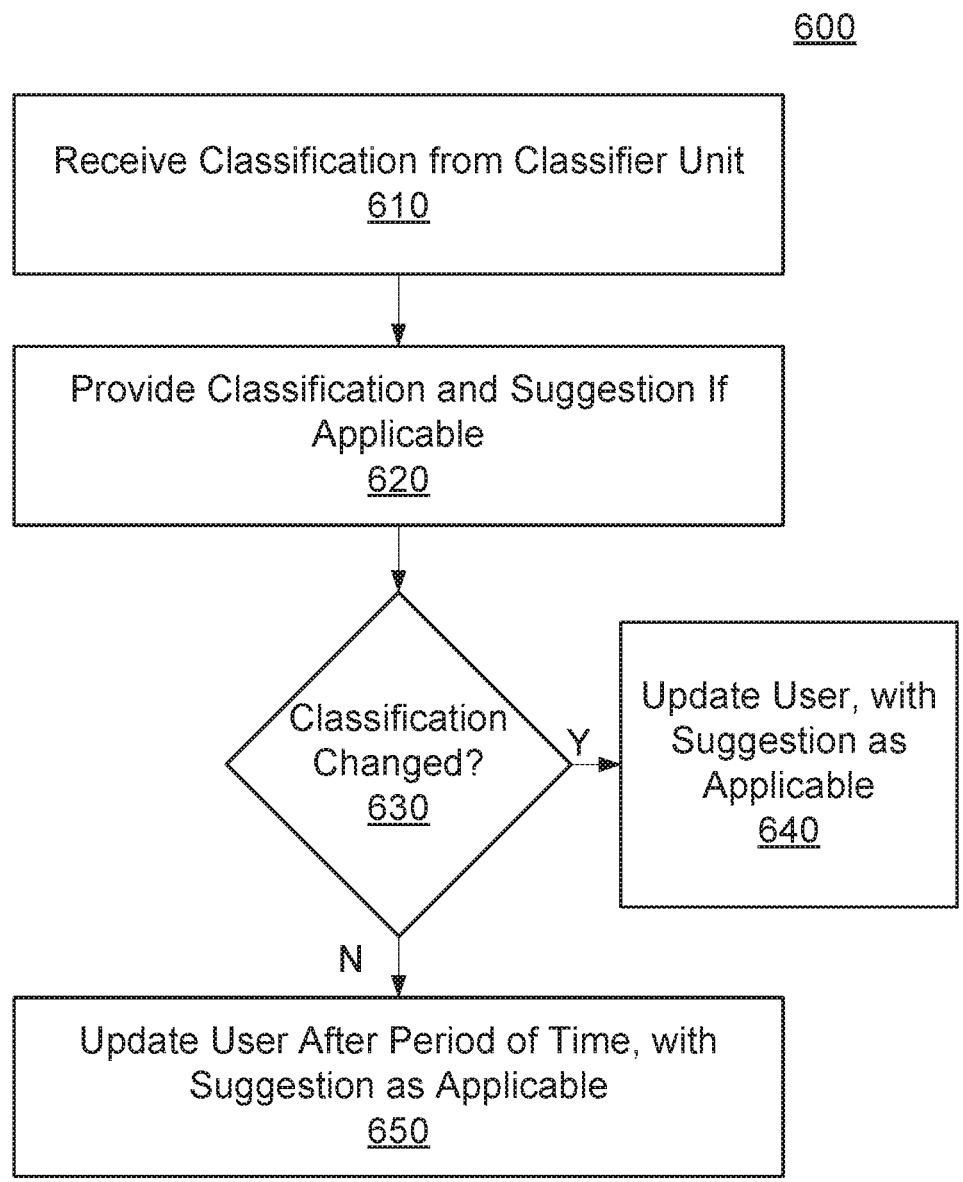
FIG. 6 depicts a flowchart of an exemplary suggestion process, consistent with disclosed embodiments.

FIG. 6 is a flowchart of a suggestion process 600. The suggestion unit 328 may implement the process 600 in order to determine what information to provide to the user of the conversation analysis system 100. Process 600 may correspond with step 450 in process 400 in which input information about the conversation is evaluated and alerts and suggestions are provided to the user as a result.

In step 610, a current classification is received from the classifier unit 326. The classification may depend on the particular classification scheme. For the sake of example, the classification may be a mood such as happy or angry. In another embodiment, the classification may additionally or alternatively include a rating of a particular mood, such as a level of interest, or a degree of which a particular emotion is shown.

In step 620, the suggestion unit 328 may provide the classification to the user through the output unit 314, depending on one or more rules associated with the classification. The user receives this information and may choose to use the information in continuing the conversation. For example, the classification may inform the user that the individual is bored, and choose to take a different approach to their speech or presentation to engage the individual.

In some instances, the suggestion unit 328 may also determine a suggestion that corresponds to the current classification. For example, some classifications may include associated topics, words, phrases, or ideas which could be used by the user in order to drive the conversation in a particular direction. For instance, if the classification is determined to be anger or frustration of the individual, the alert to the user may include a suggestion to change the topic of conversation, provide positive news, etc. In this way, the user is able to receive real-time feedback about the individual which may go beyond their ability to recognize or attentiveness to the current feelings of the individual.

As the conversation continues, the backend system 315 continues to receive conversation data from the local system 110. The classifier unit 326 may continuously or periodically update the classification of the individual over time.

In step 630, the suggestion unit 328 determines whether the classification has changed. For example, the suggestion unit 328 may compare a current classification from the classifier unit 326 to the previous classification received from the classifier unit 326 and determine whether the classification has changed. For instance, the classification may change from angry to calm or remain the same.

In step 640, in which the suggestion unit 328 determines that the classification has changed, the suggestion unit 328 may provide the new classification to the user through the output unit 314. This provides feedback to the user regarding the state of the individual. The alert to the user may additionally or alternatively include a suggestion, which may be based on one or more rules. For example, if the individual's classification changed in a negative direction (e.g., happy to angry), the alert may include a suggestion for driving the conversation in more positive direction.

In step 650, in which the suggestion unit 328 determines that the classification has not changed, the suggestion unit 328 may update the user after a period of time that the classification has not changed. For example, if the suggestion unit 328 receives the same classification from the classifier unit 326 and a threshold period of time has passed, the suggestion unit 328 may inform the user so that the user may determine that a current strategy or topic is not affecting the individual and that a new approach may be necessary or, if the classification is positive, that a current approach or topic is working and can be continued. In addition or alternative to the alert of the classification remaining the same, the suggestion unit 328 may provide a suggestion to the user through the output unit 314. For example, the suggestion unit 328 may identify a rule associated with a certain classification remaining the same over a period of time which instructs the suggestion unit 328 to provide a suggestion at that time, such as to focus on a new topic or provide new information.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method for providing real-time analysis of a conversation to an individual in the conversation, in a data processing system comprising a processor and a memory comprising instructions which are executed by the processor to cause the processor to execute a conversation analysis system, the method comprising:
   receiving conversation data captured during a face-to-face conversation between a user and an individual;
   extracting information from the conversation data indicative of a mood of the individual;
   classifying the individual based on the extracted information, including determining a mood classification;
   determining one or more rules based at least on the mood classification and stored information in a knowledge base; and
   while the face-to-face conversation is still ongoing:
      providing a suggestion to the user based on the one or more rules, wherein the suggestion includes changing a topic of the conversation or providing positive news;
      receiving updated conversation data captured after the suggestion is provided to the user;
      updating the mood classification based on the updated conversation data; and
      providing a new suggestion to the user based on a relationship between the mood classification and the updated mood classification, wherein the new suggestion includes providing a new topic of the conversation or providing new positive news.

2. The method as recited in claim 1, wherein the conversation data comprises audio and video data captured during the face-to-face conversation.

3. The method as recited in claim 1, wherein extracting information indicative of a mood of the individual comprises identifying at least one of a facial expression, hand gesture, or tone of voice of the individual.

4. The method as recited in claim 1, wherein extracting information indicative of a mood of the individual comprises analyzing the meaning of words spoken by the individual.

5. The method as recited in claim 1, further comprising analyzing the conversation data, comprising:
   recognizing the individual based on the conversation data; and
   identifying a prior conversation associated with the recognized individual,
   wherein the one or more rules is based on at least one of the recognized individual or prior conversation.

6. The method as recited in claim 5, wherein recognizing the individual comprises the use of one or more of voice recognition and facial recognition.

7. The method as recited in claim 1, wherein the classification comprises a mood of the individual.

8. The method of claim 1, wherein providing the suggestion comprises providing the mood classification of the individual to the user.

9. The method of claim 1, wherein providing the suggestion comprises providing a suggestion for driving the conversation in a desired direction based on the at least one rule.

10. The method of claim 1, further comprising receiving feedback associated with the provided alert or suggestion and learning a new rule based on the feedback.

11. A conversation analysis system, comprising:
   a local system configured to capture conversation data associated with a face-to-face conversation between an individual and a user; and
   a backend system electronically connected to the local system, the backend system including a suggestion system configured to:
   receive the conversation data from the local system;
   extract, by an analysis unit, information from the conversation data indicative of a mood of the individual;
   classify, by a classifier unit, the individual based on the extracted information, including determining a mood classification;
   determine, by a suggestion unit, one or more rules based at least on the mood classification and stored information in a knowledge base; and
   while the face-to-face conversation is still ongoing:
      provide, by the suggestion unit, a suggestion to the user based on the one or more rules, wherein the suggestion includes changing a topic of the conversation or providing positive news;
      receive, from the local system, updated conversation data captured after the suggestion is provided to the user;
      update, by the classification unit, the mood classification based on the updated conversation data; and
      provide, by the suggestion unit, a new suggestion to the user based on a relationship between the mood classification and the updated mood classification, wherein the new suggestion includes providing a new topic of the conversation or providing new positive news.

12. The conversation analysis system of claim 11, wherein the local system comprises a camera for capturing video data and a microphone for capturing audio data, the video data and audio data being the conversation data.

13. The conversation analysis system of claim 11, wherein the analysis unit is configured to identify one or more of a facial expression, hand gesture, tone of voice of the individual, or meaning of words spoken by the individual in extracting information from the conversation data.

14. The conversational analysis system of claim 11, wherein the suggestion system is further configured to:
   recognize, by a recognition unit, the individual based on the conversation data; and
   identify, by the recognition unit, a prior conversation associated with the recognized individual,
   wherein the one or more rules is based on at least one of the recognized individual or prior conversation.

15. The conversation analysis system of claim 11, wherein providing the suggestion comprises providing a suggestion for driving the conversation in a desired direction based on the at least one rule.

16. The conversation analysis system of claim 11, wherein the backend system further comprises a learning system, the learning system configured to receive feedback from the local system and learn new rules based on the feedback.

17. A computer program product for conversation analysis, the computer program product comprising a computer readable storage medium having program instructions embodied therewith, the program instructions executable by a processor to cause the processor to:

receive conversation data captured during a face-to-face conversation between a user and an individual;

extract information from the conversation data indicative of a mood of the individual;

classify the individual based on the extracted information, including determining a mood classification;

determine one or more rules based at least on the mood classification and stored information in a knowledge base; and while the face-to-face conversation is still ongoing:

provide a suggestion to the user based on the one or more rules, wherein the suggestion includes changing a topic of the conversation or providing positive news;

receive updated conversation data captured after the suggestion is provided to the user;

update the mood classification based on the updated conversation data; and provide a new suggestion to the user based on a relationship between the mood classification and the updated mood classification, wherein the new suggestion includes providing a new topic of the conversation or providing new positive news.

\* \* \* \* \*